Nov. 7, 1950        S. H. ROSS        2,529,049
METHOD OF MAGNETIZING PERMANENT MAGNET ROTORS
Filed Sept. 14, 1949
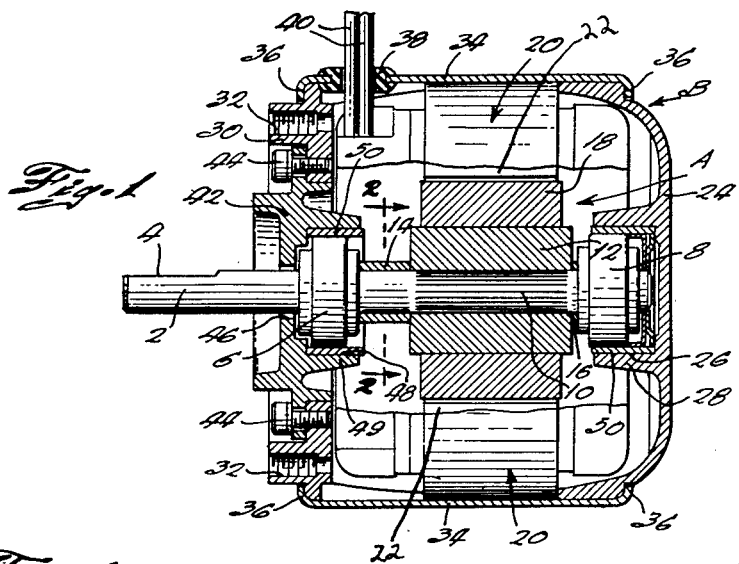
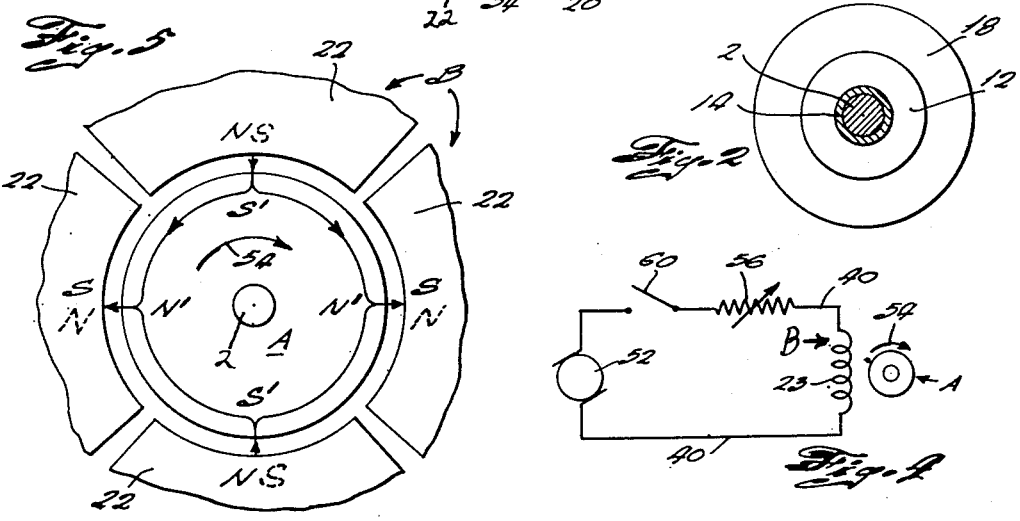
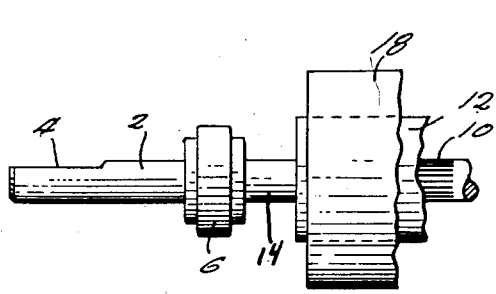
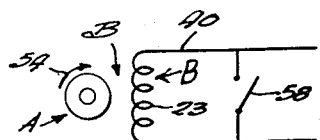
INVENTOR.
SAUL H. ROSS
BY
James and Franklin
ATTORNEYS.

Patented Nov. 7, 1950

2,529,049

UNITED STATES PATENT OFFICE 2,529,049

METHOD OF MAGNETIZING PERMANENT MAGNET ROTORS

Saul H. Ross, Oceanside, N. Y., assignor to Eastern Air Devices, Inc., Brooklyn, N. Y., a corporation of New York Application September 14, 1949, Serial No. 115,740

6 Claims. (Cl. 171—209)

The present invention relates to a method of magnetizing permanent magnet rotors which is particularly adapted to mass production methods and which results in the attainment of a uniformity of output wave shape and matching of rotor and stator which have not been attainable in the past.

Many types of rotating electrical equipment employ rotors which are permanently magnetized. These rotors are mounted in close magnetic interrelationship with stators usually of the multi-pole type, which stators are adapted to be electrically energized so as to cause the rotors to rotate, the assembly thus functioning as a motor, or, if the assembly is to function as a generator, the rotor is mechanically rotated and an electrical voltage is generated in the stator.

It has in the past been the general practice to magnetize the individual rotors in a magnetizing fixture separate and distinct from, and even different in construction form, the stators with which the rotors are to be associated in use, a single magnetizing fixture being used to magnetize a large number of rotors. It has also been the universal practice, insofar as is known to applicant, to maintain the rotors in a stationary condition while they are being magnetized. Various types of fixtures have been adapted to this purpose, most being adapted for use only or primarily with rotors having distinct pole structures thereupon.

One important drawback to the prior art method and apparatus is that the exact positioning of the magnetic poles on the rotor rarely, if ever, corresponds to the exact positioning and spacing of the poles on the stator with which the rotor will ultimately be associated in use. The resultant lack of harmony in cooperation between the rotor and stator manifests itself in excessive losses and slightly uneven operation when the unit is operated as a motor and in irregularities in the normal sinusoidal wave shape of the electrical output when the unit is operated as a generator.

Even if the magnetizing fixture employer were to be made as closely similar as is possible to the stator with which the rotor will be associated in use, unavoidable differences between individual stators could not be compensated for in advance and, as a result, the losses, uneven operation, and irregular wave shape above described will nevertheless obtain.

It has been discovered that the use of separate magnetizing fixtures in the magnetization of permanent magnet rotors can be completely eliminated, and that the rotor can be magnetized in the very stator with which it will be associated in use—and this without any modification of the structure of the stator or rotor concerned. The importance of this discovery from a manufacturing point of view is apparent. Not only is the use of a separate fixture completely eliminated, thus making for a material reduction in expense, but since each rotor may be magnetized by the very stator with which it will be associated in use, the rotor and stator will function in an extremely efficient manner and the electrical output of the stator, when the equipment is operated as a generator, will be exceedingly regular and almost exactly sinusoidal.

An important distinguishing characteristic of the present method over that employed in the prior art is the fact that in the present method, the rotor is magnetized while rotating, that is to say, it is magneized while it is moving as it will move when in use. This novel aspect of the present invention has considerable independent importance, since the accuracy and alignment of the magnetization of the rotor will necessarily correspond closely to that which is required of it when the equipment is used as a motor or as a generator.

Reduced to its simplest form, the method comprises placing the rotor in a rotating magnetic field and causing the rotor to rotate with the field. If no load is applied to the rotor, there will be no slippage between it and the rotating field and consequently the rotor will "lock in" with the field and rotate synchronously with it. If the intensity of the field is appropriately regulated, and if the duration of this synchronous operation is permitted to continue until magnetic poles are permanently induced in the rotor, it will be apparent that the magnetization of the rotor will correspond very closely or exactly with that required while the rotor rotates and with the effective magnetic action of the structure, generally an electrically energized stator, which induced the rotating magnetic field.

In the course of experimentation with this method—which experimentation has proved to be eminently satisfactory, even under conditions approximating those of a production line—various modifications have been discovered effective to cure difficulties arising from slight misalignment of the rotor with the stator, distortion of the magnetization produced in the rotor, or from other causes—all of which is described more in detail hereinafter.

To the accomplishment of the foregoing advantages and such other objects as may hereinafter appear, the present invention relates to the method of magnetizing permanent magnet rotors as defined in the appended claims and as described in this specification, taken together with the accompanying drawings, in which—

Fig. 1 is a side cross-sectional view of a typical embodiment of alternator with which the invention can be advantageously employed;

Fig. 2 is an end cross-sectional view taken along the line 2—2 of Fig. 1, showing a typical rotor;

Fig. 3 is a side view, partially broken away, showing some details of the rotor construction;

Fig. 4 is a schematic electric view illustrating in simple form the circuit connections required for the magnetizing method;

Fig. 5 is a schematic magnetic view illustrating the manner in which permanent magnet poles are induced in the rotor; and Fig. 6 is a schematic electric view illustrating the connections necessary for one means of compensating for distortion or inaccuracy in the permanent magnetism of the rotor.

The method will be here described in conjunction with the magnetization of the rotor generally designated A, which is used in conjunction with the stator assembly generally designated B of an alternator of simple construction. While one particular type of rotor A and stator B are here described, it will be understood that the invention is not limited to that specific type.

The rotor comprises a shaft 2 having a keyed or flattened end 4 adapted to be coupled to any suitable driving or driven means. Secured on the shaft are front and rear bearings 6 and 8, respectively, a portion 10 of the shaft between the bearings 6 and 8 being knurled or roughened so as to fixedly receive thereover a cylindrical aluminum insert 12 which is pressed into position and which is retained in position not only by the press fit, but also by the sleeves 14 and 16 on the shaft 2 between each end of the insert 12 and the appropriate bearing 6 or 8. An annulus 18 of magnetic material of high magnetic permeability and retentivity, such as Alnico, is then secured in position in any appropriate way on and around the insert 12. It is in this annulus 18 that the permanent magnetic poles are induced.

The rotor is adapted to be used in conjunction with stator assembly B which comprises a magnetic assembly generally designated 20, which may be formed in any appropriate manner and which usually includes a plurality of pole faces 22 (see Fig. 5) of high permeability but low retentivity, around which coils 23 (indicated schematically in Figs. 4 and 6) are wound in a manner well known in the art so that magnetic poles are induced in the pole faces 22 in accordance with the intensity and direction of the current passing through the coils 23.

The assembly 20 is secured in place between a rear end cap 24, which may take the form of an aluminum die casting having a centrally disposed recess 26 therein—here shown as defined by the upstanding ring 28—and a mounting ring 30 provided with internally threaded apertures 32 adapted to receive mounting screws so that the assembly may be secured in any desired location. The rear end cap 24, the assembly 20, and the mounting ring 30 are all secured together by means of an outer frame 34 of metal or the like, the ends 36 of which may be spun over appropriately positioned shoulders on the rear end cap 24 and mounting ring 30 respectively. The casing 34 is provided with an apertured grommet 38 through which the wires 40 connecting with the coils 23 of the stator assembly B are passable. The front end cap 42 is secured in position in the mounting ring 30 by means of the screws 44, the front end cap 42 having an aperture 46 through which the shaft 2 is adapted to project and having a recess 48 axially aligned with the recess 26 in the rear end cap and defined by the upstanding ring 49. Each of the recesses 26 and 48 may be provided with annular inserts 50 of cold-rolled steel or the like adapted to snugly receive the bearings 6 and 8 of the rotor A. The purpose of the inserts 50 is to permit repeated removal of the rotor bearings 6 and 8, and with them the rotor H, without excessive wear or misalignment.

As will be apparent from the above construction, the rotor A may be readily placed into the stator assembly B by inserting the rear bearing 8 inside the insert 50 in the recess 26 and then placing the front end cap 42 in position, the front bearing 6 of the rotor A fitting inside the insert 50 in the recess 48. Removal of the rotor A is correspondingly accomplished.

If the motor is assembled as illustrated in Fig. 1 and if the wires 40 are connected to an external source 52 of alternating current (see Fig. 4), a rotating magnetic field will be produced inside the pole faces 22. If, as is here illustrated, only a single-phase winding is employed, the rotor A will not be self-starting, but if the intensity of the rotating magnetic field be sufficiently great and if the rotor A be given an initial rotative impulse, as by manually spinning the shaft 2, it will continue to rotate, being pulled along by the rotating magnetic field derived from the stator assembly B. If that field is of sufficient magnitude and if no load be placed on the rotor A, the rotor A will tend to rotate in exact snychronism with the rotating magnetic field for as long as the field continues to exist.

Fig. 5 illustrates schematically an instantaneous condition within the apparatus during its rotation. The upper and lower pole faces 22 will, at a first instant, have north magnetic poles N induced therein, while the right-hand and left-hand pole faces 22 have south magnetic poles S induced therein. Accordingly, lines of magnetic force will tend to pass from each north magnetic pole N to each adjacent south magnetic pole S. Since the rotor A is of high magnetic permeability and is disposed relatively close to the pole faces 22, with only a small air gap therebetween, most of the lines of force passing from one pole face 22 to an adjacent pole face 22 will tend to pass through the rotor A itself and hence will induce magnetic poles of opposite polarity N' and S' in the rotor A. At a second instant, each of the pole faces 22 will, as indicated by the letters N and S in broken lines in Fig. 5, have induced therein a magnetic pole of opposite polarity, but at that instant the rotor A will have rotated a sufficient distance in the direction of the arrow 54 from its position at the first instant so that the south magnetic poles S' induced therein at the first instant will be opposite the right-hand and left-hand pole faces 22. Since those pole faces 22, at the second instant, will have north magnetic poles N induced therein, this will tend to aid in the formation of permanent south magnetic poles S' in the rotor A at the positions indicated. If the rotation is permitted to continue for a long enough period, and if the magnitude of the rotating magnetic field is sufficiently high, fixed magnetic poles will be induced in the rotor A corresponding closely to the location and spacing of the magnetic poles induced in the pole faces 22 of the stator B.

It has been found that best results are obtained when a relatively low voltage is first applied to the coils 23 in the stator B, that voltage being adequate to induce a rotating magnetic field of sufficient intensity to maintain the rotor A in synchronous rotation. Once synchronism is obtained, the intensity of the magnetic field is increased, as by increasing the current through the coils of the stator B, up to the maximum value at which synchronous rotation of the rotor A will continue. This value will vary with the individual types of equipment, but when once determined empirically for a given type, it will tend to remain substantially constant. It is believed that when excessive voltage is applied to the coils 23, the rotor A has become saturated with all of the magnetic field which it can carry, and the magnetic force induced over and above that which the rotor can carry leaks directly from pole 22 to pole 22 and interrupts the synchronous operation of the equipment. This maximum effective value of current applied to the coils 23 of the stator B is continued over a short period of time and the current through the coils of the stator B is then gradually reduced to zero. In Fig. 4, a variable resistor 56 is schematically indicated for the purpose of varying the current through the coil of the stator B, but the current may be varied in any appropriate manner, of course, as, for example, by the use of a variac.

The length of time involved for each of the above steps will vary greatly depending on the equipment used, but it may be stated that for magnetizing the rotors of small alternators the entire process may consume no more than one or two minutes.

Solely by way of illustration, the following data is supplied, illustrating actual values of voltage and current applied to the coils of the stator B in a four-pole alternator having a one-inch long stator stack and a half-inch long rotor core. Forty (40) volts initially applied to the coil gave rise to a magnetizing current of 4.15 amperes at 60 cycles, which produced a rotating magnetic field sufficient in intensity so that the rotor would rotate in synchronism therewith. Increasing the voltage to 70 volts produces a magnetizing current of 7.3 amperes, the rotor still rotating in synchronism. The application of additional voltage to the coil resulted in loss of synchronism and destruction of the magnetization effect obtained. When a similar 4-pole alternator was utilized with a rotor having a one-inch long core, it was found that the voltage applied to the magnetizing coils could be increased to 90 volts, giving a magnetizing current of 8.4 amperes, before synchronism was destroyed.

After the voltage applied to the coils has been gradually reduced to zero—that is to say, after the intensity of the induced rotating magnetic field has been reduced to zero—rotor A is found to be permanently magnetized in a manner almost exactly corresponding to the magnetic characteristics of the stator B by which it was magnetized. It has been found desirable to remove the rotor A from the stator B and permit it to rest in air in a magnetic-free atmosphere for a period of several hours in order that the magnetism in the rotor A may become set and fixed in position free of any external magnetic influences. Thereafter the rotor A may be placed in any stator B, but preferably in the very stator B with which it has been magnetized, and when so placed, it will operate in an exceedingly efficient manner with minimum losses and with maximum fidelity of output, particularly in so far as wave shape is concerned.

Slight distortion of the permanent magnetic field sometimes occurs during the time that the rotor A is permitted to stand after it has been magnetized. It has been found that a very convenient way of neutralizing or destroying this distortion is to rotate the rotor A when in place in the stator B so as to generate an alternating voltage in the coils 23 of the stator B (see Fig. 6). If, while the rotor A is rotating, the voltage output of the stator B be suddenly short-circuited once or twice, as by means of the switch 58, it will cause the magnetic fields of the rotor A and stator B to momentarily line up exactly and thus destroy any distortion effects which may have taken place.

Although with accurate construction there should be no appreciable misalignment between rotor A and stator B when assembled, it is usually impossible to avoid that result in all units when they are produced on a mass production basis. This is a prime source of output distortion, even when the method of the present invention is used. It may also occur that in an individual stator, the number of turns in the coils 23 wound about each pole piece 22 may vary, due to a manufacturing error. This, too, is often a source of great distortion. One method which often acts to minimize, although not completely eliminate, the distortion resulting from causes such as these, is to incorporate the switch 60 into the magnetizing circuit of Fig. 4. If, while the rotor A is rotating in synchronism with the rotating magnetic field, the switch 60 is snapped on and off a few times at random, thus causing the magnetizing current through the coils 23 of the stator B to start and stop as instantaneously as is permitted by the circuit constants, it is likely that, for each snap of the switch 60, the rotor A will be in different relative rotative positions with respect to the pole faces 22. Hence, the distortion will tend to be averaged out to what is usually a minimum and acceptable value. It must be emphasized, however, that this modification of the basic method should be attempted only in extreme cases and with great judiciousness, since the effectiveness of the method depends upon the exact position of the rotor A relative to the stator B during each snapping of the switch 60, a condition not readily controllable, and once an acceptable magnetization is obtained a superfluous snapping of the switch 60 might just as well mar the acceptable result as accentuate it.

It will be apparent that the method here disclosed is particularly well adapted to the magnetization of rotors A of the type here specifically illustrated, which rotors have no separated pole structures around which temporary magnetizing coils may be wound in the manner of the prior art. Nevertheless, even with the latter type of rotor, the instant method has important advantages in production, speed, in inexpensiveness of equipment, and in efficient operation of the resultant motors or generators. The significance of accurate magnetic interrelationship between a rotor and stator is most marked in the case of generators, where the wave shape of the electrical output is usually of great important. When the rotors are magnetized according to the present method, the output of the generators of which they form a part, when viewed on the oscilloscope, is seen to be smoothly sinusoidal. Manifold advantages result from magnetizing the rotors while they are active, as distinguished from static, because of the fact that the magnetization takes place under the conditions of use of the rotor, and not under artificial conditions. The method of the present invention permits each individual rotor A to be magnetized by the very stator B with which it will ultimately be associated in use, thus permitting the idiosyncracies of that stator B to influence the magnetization of the rotor A so that the two will eventually cooperate with one another in a most efficient manner.

The invention has been here described in conjunction with a particular rotor-stator assembly, but it will be apparent that the method can be used with many other specific types of equipment. Although the invention has been here described in conjunction with a single-phase winding in the stator, necessitating imparting an initial rotative impulse to the rotor, it will be understood that if multi-phase alternating current is applied to an appropriately-wound stator, the rotor will be self-starting. Other variations may be made all within the scope of the invention as defined in the following claims.

I claim:

1. The method of magnetizing permanent magnet rotors which comprises placing a rotor within a rotating magnetic field, rotating said rotor synchronously with said field, and intermittently and at random suddenly collapsing and then restoring said magnetic field a plurality of times while said rotor is rotating synchronously times while said rotor is rotating synchronously, thus ensuring accurate alignment between the poles of said rotating field and the poles induced in said rotor.

2. The method of magnetizing permanent magnet rotors which comprises placing a rotor within a rotating magnetic field, rotating said rotor synchronously with said field, increasing the intensity of said field to the maximum value at which said rotor will remain in synchronism, intermittently and at random suddenly collapsing and then restoring said magnetic field a plurality of times while said rotor is rotating synchronously, and then reducing the intensity of said field to zero, thus ensuring accurate alignment between the poles of said rotating field and the poles induced in said rotor.

3. The method of magnetizing permanent magnetic rotors which comprises rotatably mounting a rotor within an electrically energizable stator assembly, applying alternating current to said stator so as to develop a rotating magnetic field therein, rotating said rotor synchronously with said field, and intermittently and at random suddenly collapsing and then restoring said magnetic field a plurality of times while said rotor is rotating synchronously, and gradually reducing the alternating current to zero, thus ensuring accurate alignment between the poles of said stator assembly and the poles induced in said rotor.

4. The method of magnetizing permanent magnet rotors which comprises rotatably mounting a rotor within an electrically energizable stator assembly, applying alternating current to said stator so as to develop a rotating magnetic field therein, a rotating said rotor synchronously with said field, raising the voltage of the current applied to said stator to the maximum value at which said rotor will continue to rotate at synchronous speed, intermittently and at random suddenly collapsing and then restoring said magnetic field a plurality of times while said rotor is rotating synchronously, and gradually reducing the alternating current to zero, thus ensuring accurate alignment between the poles of said stator assembly and the poles induced in said rotor.

5. The method of claim 3, in which, after the rotor has been magnetized, it is rotated within a stator assembly so as to generate an output voltage in said stator, and momentarily shortcircuiting said output voltage in order to ameliorate many distortion effects.

6. A method of magnetizing permanent magnet rotors which comprises rotatably mounting a rotor within the stator assembly with which it is to be associated in use, applying alternating current to said stator so as to develop a rotating magnetic field therein, rotating said rotor synchronously with said field, gradually reducing the alternating current to zero, removing said rotor from said stator and exposing said rotor to air for stabilization purposes, replacing said rotor within said stator, rotating said rotor so as to generate an output voltage in said stator, and momentarily shortcircuiting said output voltage in order to ameliorate distortion effects.

SAUL H. ROSS.

REFERENCES CITED

The following references are of record in the file of this patent:

UNITED STATES PATENTS

| Number | Name | Date |
|---|---|---|
| 1,599,645 | Burrows | Sept. 14, 1926 |
| 1,950,754 | Scofield | Mar. 13, 1934 |
| 2,101,665 | Arey | Dec. 7, 1937 |
| 2,133,686 | Cox | Oct. 18, 1938 |
| 2,328,743 | Roters | Sept. 7, 1943 |

FOREIGN PATENTS

| Number | Country | Date |
|---|---|---|
| 548,671 | Great Britain | Dec. 18, 1936 |